United States Patent [19]

Mitsuuchi et al.

[11] Patent Number: 5,075,354

[45] Date of Patent: Dec. 24, 1991

[54] POLYESTER RESIN COMPOSITION AND PROCESS FOR THE PREPARATION THEREOF

[75] Inventors: Masamichi Mitsuuchi; Tsuyoshi Minamisawa, both of Shizuoka, Japan

[73] Assignee: Polyplastics Co., Ltd., Osaka, Japan

[21] Appl. No.: 574,045

[22] Filed: Aug. 29, 1990

[30] Foreign Application Priority Data

Aug. 30, 1989 [JP] Japan .................................. 1-224147

[51] Int. Cl.$^5$ ............................................... C08K 9/02
[52] U.S. Cl. ................................... 523/217; 523/209; 523/351; 523/344; 524/494; 524/537; 524/539
[58] Field of Search ........................ 523/209, 351, 444; 524/494, 537, 539

[56] References Cited

U.S. PATENT DOCUMENTS 4,533,680  8/1985  Kasuga et al. ........................ 523/220
4,623,586  11/1986  Umeya et al. ........................ 428/324
4,874,800  10/1989  Minamisawa et al. .............. 523/205

FOREIGN PATENT DOCUMENTS 0122560  10/1984  European Pat. Off. .
0278546  8/1988   European Pat. Off. .

OTHER PUBLICATIONS

Chemical Abstracts, vol. 110, No. 10, 3/6/89; Columbus, Ohio U.S.A., p. 369 Ref. No. 81212K & JP-A-63 201 041.

Primary Examiner—Paul R. Michl
Assistant Examiner—Edward J. Cain
Attorney, Agent, or Firm—Nixon & Vanderhye

[57] ABSTRACT

Polyester compositions exhibiting decreased distortion (warpage), improved processability and productivity are produced by melt-blending a thermoplastic polyester resin with between 3 to 65% by weight of a fibrous reinforcement medium, and between 3 to 65% by weight of binder-agglomerated glass granules.

20 Claims, No Drawings

POLYESTER RESIN COMPOSITION AND PROCESS FOR THE PREPARATION THEREOF

FIELD OF INVENTION

The present invention generally relates to polyester resin compositions and to processes for their preparation. More particularly, the present invention provides low cost resin compositions exhibiting improved processability from which molded articles having reduced distortion and/or warpage can be made. Moreover, such articles can be made without adversely affecting the polyester resin's otherwise excellent inherent mechanical properties.

BACKGROUND AND SUMMARY OF THE INVENTION

Thermoplastic polyester resins such as polyalkylene terephthalate resins have excellent mechanical and electrical properties, as well as desirable physical and chemical characteristics. As a result, polyester resins have been used as engineering plastics in an extensive field of end-use applications including automobiles, electrical and electronic apparatus, and the like.

Although thermoplastic polyester resins can, in and of themselves, be molded into articles, various reinforcements or additives have typically been incorporated in polyester resin compositions (depending upon the field of application) so as to obtain improved resin properties, particularly mechanical properties.

It is also well known that the addition of a fibrous reinforcement, such as glass or carbon fibers, imparts desirably high mechanical strength properties and increased rigidity to the thermoplastic polyester resins. However, molded articles formed of thermoplastic polyester resins containing fibrous reinforcement materials tend to distort (warp) and thus cannot be used in environments where close spatial tolerances are required.

The present invention is directed towards solving the distortion problems associated with molded articles formed of fiber-reinforced polyester resins. More particularly, the present invention is directed towards enhancing the distortion resistance of polyester resin compositions containing fibrous reinforcement and/or flaky fillers without damaging the otherwise excellent mechanical properties associated with polyester resins. In this regard, the present invention broadly resides in the use of binder-agglomerated glass granules (to be described below) instead of conventional flaky filler materials in combination with a fibrous reinforcement medium so as to attain polyester resin compositions of decreased distortion when molded.

More specifically, the present invention relates to novel polyester resin compositions including (A) between 20-94% by weight (based on the total composition weight) of thermoplastic polyester resin with (B) between 3 to 65% by weight (based on the total composition weight) of a fibrous reinforcement medium (), and (D) between 3 to 65% by weight (based on the total composition weight) of binder-agglomerated glass granules. The present invention is further characterized by methods to obtain such a composition whereby the above-noted components are mixed together and then melt-blended.

DETAILED DESCRIPTION OF THE PREFERRED EMBODIMENTS

The thermoplastic polyester resin that may be used in the compositions of the present invention is a polyester prepared by the polycondensation of polyester forming monomers. Thus, the polyester may be prepared by polycondensing a dicarboxylic acid compound and a dihydroxy compound, a hydroxy carboxylic acid compound itself or any combination of the same. The compositions of the present invention may include homopolyesters and/or copolyesters.

Examples of the dicarboxylic acid compound that may be used in the preparation of the polyester resin include well-known dicarboxylic acids such as terephthalic, isophthalic, naphthalenedicarboxylic, diphenyldicarboxylic, diphenyl ether dicarboxylic, diphenylethanedicarboxylic, cyclohexanedicarboxylic, adipic and sebacic acids and alkyl, alkoxy or halogen-substituted derivatives thereof. Furthermore, these decarboxylic acids may each be used in the polycondensation as an ester-forming derivative, such as dimethyl ester. Two or more of the dicarboxylic acid compounds may be used simultaneously, if desired.

Examples of the dihydroxy compound that may be used to prepare the polyester resin employed in the compositions of this invention include dihydroxy compounds, such as ethylene glycol, propylene glycol, butanediol, neopentyl glycol, hydroquinone, resorcinol, dihydroxyphenyl, naphthalenediol, dihydroxydiphenyl ether, cyclohexandiol, 2,2-bis(4-hydroxyphenyl)propane and diethoxylated bisphenol A; polyoxyalkylene glycols and alkyl, alkoxy or halogen-substituted derivatives thereof. The dihydroxy compounds may be used either alone or as a mixture of two or more of the same.

Examples of suitable hydroxy carboxylic acids include hydroxy carboxylic acids themselves, such as hydroxybenzoic acid, hydroxynaphthoic acid and diphenyleneoxycarboxylic acid; and alkyl, alkoxy or halogen-substituted derivatives thereof. Furthermore, ester-forming derivatives of these hydroxy carboxylic acids may be used. According to the present invention, one or more of the compounds may be employed during the polycondensation reaction.

Polyester resins having branched or cross-linked structures which result when a minor amount of a trifunctional monomer is used in addition to the above-noted monomer components may also be employed in the composition of the present invention. Examples of preferred trifunctional monomers include trimellitic, trimesic and pyromellitic acids, pentaerythritol and trimethylolpropane.

According to the present invention, all of the thermoplastic polyester resins prepared by the polycondensation of the above-noted monomers can be used as the component (A) either alone, or as a mixture of two or more of the same. It is preferred, however, that the polyester resin component (A) be a crystalline polyalkylene terephthalate, for example polybutylene terephthalate (PBT), polyethylene terephthalate (PET) or a copolymer containing at least 60% by weight of polybutylene terephthalate or polyethylene terephthalate units.

If necessary, the thermoplastic polyester resin component (A) may contain up to about 30% by weight of other thermoplastic resins, such as polyamides, polycarbonates, polyolefins, fluororesins or acrylic resins. Particularly, incorporating an amorphous thermoplastic resin in addition to a crystalline polyester resin as component (A) yields further reductions in distortion of molded articles. Thus, in some cases, a combination of a crystalline thermoplastic polyester resin and an amorphous resin is preferred. In this regard, the incorporation of one or more member selected from among polycarbonates, ABS resins and phenoxy resins together with a crystalline thermoplastic polyester resin is especially favorable.

The fibrous reinforcement medium that may be used in the compositions of the present invention is not particularly limited. Thus, useable fibrous reinforcement media within the scope of the present invention includes mineral fibers, such as glass fibers, carbon fibers, graphite fibers, metal whiskers, metal fibers, silicon carbide fibers, asbestos fibers and wollastonite fibers, in addition to various organic fibers. The use of any particular fibrous reinforcement medium or combination of fibrous reinforcement media may suitably be selected in dependence upon the resin properties that may be desired for a given end-use application, for example, structural reinforcement and/or electrical conductivity properties, or improvements to the resin's friction characteristics or flame retardance.

The diameter and length of the fibrous reinforcement medium may each be arbitrarily selected depending upon the required performance characteristics, such as mechanical properties or distortion resistance. It is generally suitable to use glass fibers having a diameter of at least 1 $\mu$m and a length of at least 15 $\mu$m, and preferably glass fibers having a diameter of between 2 to 20 $\mu$m and a length of at least 50 $\mu$m. If necessary, a sizing agent or surface treatment may be used with the fibrous reinforcement medium, examples of which include functional compounds such as epoxy, isocyanate, silane and titanate compounds. If employed, the sizing compounds will be present in amounts up to 10% by weight, and preferably, between 0.5 to 5% by weight (based on the weight of the fibrous reinforcement medium). These sizing compounds may each be preapplied to the fibrous reinforcement medium, or may be added to the resin composition as an independent component simultaneously with the fibrous reinforcement medium during preparation of the composition.

The amount of the fibrous reinforcement medium that is used in the compositions of this invention is between 3 to 65% by weight, and preferably between 5 to 50% by weight, based on the total composition weight. If less than 3% by weight of the fibrous reinforcement medium is employed, then little (if any) reinforcement effect is obtained. On the other hand, if the amount of fibrous reinforcement medium exceeds 65% by weight, then difficulties are encountered during molding of the resulting composition.

The compositions of the present invention are especially characterized by containing binder-agglomerated glass granules as component (C) in addition to the above-described fibrous reinforcement medium as component (B).

The simultaneous use of a fibrous reinforcement medium and a flaky filler material, such as glass flakes or mica flakes has previously been proposed for reducing the distortion or warpage of molded articles, and in this regard, such a combination provides some measure of effectiveness. However, the result in terms of distortion and/or warpage is still unsatisfactory. Particularly, when large amounts of reinforcement media are used, productivity problems in forming molded articles are typically encountered thereby lowering productivity.

Surprisingly, it has now been found that the use of glass flakes that have been agglomerated with a binder remarkably reduce distortion and warpage of molded articles. In addition, processing problems such as "flying" and "bridging" are avoided—presumably because the agglomerated glass flakes are more readily dispersible in the polyester base resin as compared to conventional (non-agglomerated) glass flakes employed previously. As a result, essentially no fractures during extrusion and kneading are encountered.

The term "binder-agglomerated glass granules" used herein and in the accompanying claims is intended to refer to a glass granule having a major axis of between 50 to 5000 $\mu$m and obtained by agglomerating a number of discrete glass flakes each having a mean particle diameter of between 5 to 1000 $\mu$m and a mean thickness of between 0.5 to 7 $\mu$m with a binder (preferably a thermoplastic binder resin). If the effective granule size is too small, then the benefits sought by the present invention cannot be attained. However, if the granule size is too large, then poor dispersibility of the flakes in the matrix resin will result. According to the present invention, it is preferable that the agglomerated glass granules have a mean particle diameter of between 100 to 2000 $\mu$m, and more preferably between 300 to 2000 $\mu$m, and a maximum particle diameter not exceeding 5000 $\mu$m.

The binder used to agglomerate the glass flakes is not particularly limited. Thus, virtually any binder capable of agglomerating glass flakes may be used, provided of course that it does not exert adverse effects upon the polyester matrix resin. Particular examples of the binder that may be used include addition of polymers of an olefinic monomer such as polyvinyl acetate, polyacrylate, polyvinylpyrrolidone, (acid-modified) polyethylene and (acid-modified) polypropylene and copolymers thereof; polyaddition products such as polyurethane and polyurea; polycondensation products such as unsaturated polyester, nylon and epoxy resin; ring-opening polymerization products such as nylon 6 and polyehtyloxazoline; addition condensation products such as urea-formalin resin; and epoxysilane, among which thermoplastic resins and epoxy resins are especially preferred.

The binder-agglomerated glass granules can be prepared by the use of a binder as described above according to any known agglomeration technique. For example, the binder-agglomerated glass granules can be prepared by adding glass flakes to a solution of a binder in a suitable organic solvent, and then mixing the components in a fluidized state, followed by drying the resulting mixture.

The glass flakes that are agglomerated may first be subjected to a surface treatment using coupling agents for the purpose of enhancing the adhesion and/or dispersibility of the flakes in the matrix resin. The surface treatment may be carried out simultaneously with the agglomeration of the glass flakes. Alternatively, a coupling agent may be added independently during the preparation of the resin composition. The coupling agents that may be used for the above purpose include epoxy, isocyanate, silane, titanate and zirconia compounds. Of these, epoxy and silane compounds are especially preferred.

The amount of the binder-agglomerated glass granules that may be used in the present invention is between 3 to 65% by weight, and preferably between 5 to 50% by weight (based on the entire composition weight) that the total amount of the fibrous reinforcement medium and the binder-agglomerated glass granules (i.e., the total of components (B) and (C)) does not exceed 65% by weight of the entire composition. If the amount of binder-agglomerated glass granules is less than 3% by weight, then little (if any) beneficial effect is realized. On the other hand, if the amount of binder-agglomerated glass granules exceeds 65% by weight, then molding difficulties will be encountered.

The compositions of the present invention may optionally contain other additives conventionally used in thermoplastic or thermosetting resins so as to impart desired physical characteristics thereto. Examples of additives that may be used include powdery, granular and flaky inorganic fillers, (i.e., other than the binder-agglomerated glass granules noted above); stabilizers such as antioxidants, heat stabilizers, and ultraviolet absorbers; flame retardants; antistatic agents; lubricants; mold release agents; comorants such as dyes and pigments; lubricating oils; plasticizers; crystallization accelerators ad nucleating agents.

The compositions of the present invention can be easily prepared using conventional processes for the preparation of a reinforcement-filled resin. More particularly, the fibrous medium may be used in the form of a chopped strand or roving and if necessary, may be cut into suitable sizes or used as the present invention may then be mixed together, kneaded and extruded with a conventional extruder to give a pelletized composition. In this regard, little (if any) fracturing and/or pulverization of the glass flakes ensue—a problem associated with processing of prior art compositions.

Alternatively, the fibrous reinforcement medium and the binder-agglomerated glass flakes may be added into a melt phase of the polyester resin in an extruder. Even in such a "two-stage" addition process, the processability of the composition is extremely improved and fracturing of the fibrous reinforcement and/or glass flakes in the extruder is reduced so as to provide composition exhibiting excellent mechanical properties and distortion resistance.

The compositions of the present invention are thus especially characterized by containing a fibrous reinforcement medium and binder-agglomerated glass granules from which molded articles can be prepared having significantly reduced distortion (warpage), as compared to compositions of the prior art which contain non-agglomerated glass flakes. In addition, the mechanical strength properties (such as tensile strength) are improved. Furthermore, the compositions of the present invention do not exhibit problems associated with the prior art, such as clogging by the glass flakes or poor extrusion properties. Thus, the compositions of the present invention are of a more consistent quality and can be made with enhanced productivity.

The compositions of the present invention may be used to form exterior trim parts and structural and functional parts and components of automobiles, electrical appliances and other devices. Particular examples of the use of the composition include automotive exterior trim parts such as fenders, fuel lids, louvers, lamp housings and outer door handles; structural components, such as the chassis audio, video tape recorders and stereos; and working parts such as gears, cams, levers, guide stays; clutches and rollers. Furthermore, the compositions may be used in electrical or electronic components such as connectors, switches, relays, coils, bobbins, key stems or chassis; cameras, radios, various office automation machines such as facsimile, copying machines, or computers; IC cases, capacitor cases or motor parts.

EXAMPLES

The present invention will now be described in detail by referring to the following nonlimiting Examples.

The methods for evaluating the characteristics employed in; the following Examples are as follows:

(1) Determination of distortion:

A flat test piece (80 mm × 80 mm × 2 mm) having one gate on its side was molded and placed on a surface plate so as to measure the distortion of the most significantly distorted part (i.e. that part wherein the gap between the surface plate and the test piece is largest) of the test piece.

(2) Tensile strength:

Determined according to ASTM D 638.

(3) Processability during extrusion (observed during pelletization of the composition):

A mixture comprising a polyester resin and glass fiber and/or glass flakes was extruded with an extruder having an inner diameter of 40 mm. The feeding state into an extruder (adhesion or clogging of glass fiber or glass flake in a hopper), the bite of the feed and the state of the extrudate (breakage of strand or surging), were visually observed and categorized using the following four criteria:

| 4 | 3 | 2 | 1 |
|---|---|---|---|
| (not observed) | adhesion or clogging in hopper | | (significant) |
| (good) | strand breakage or surging | | (poor) |

EXAMPLES 1 TO 5

Polybutylene terephthalate alone or a mixture thereof with polyethylene terephthalate or polycarbonate, glass fibers and binder-agglomerated glass flakes were preliminarily mixed together in a ratio as specified in Table 1, fed into an extruder at a rate of 12 kg/hr and melt-kneaded to obtain a pelletized composition. This composition was then injection-molded into various test pieces. These test pieces were evaluated according to the above-mentioned criteria.

COMPARATIVE EXAMPLES 1 AND 2

A pelletized composition was prepared in the same manner as that of the foregoing Examples except that polybutylene terephthalate and either glass fibers or agglomerated glass flakes were used and evaluated in a similar manner to that described above. The results are provided in Table 1.

COMPARATIVE EXAMPLES 3 TO 7

Polybutylene terephthalate alone or a mixture thereof with polyethylene terephthalate or polycarbonate, glass fiber and non-agglomerated glass flakes were mixed together at a ratio as specified in Table 1, fed into an extruder at a rate of 5 kg/hr and melt-kneaded to obtain a pelletized composition. This composition was then injection-molded into various test pieces. The test pieces were examined according to the above-mentioned methods. The feeding rate in these Examples was first set at a rate of 12 kg/hr similar to the foregoing Examples. However, the glass fibers and glass flakes clogged at the joint zone between the feeder and the extruder thereby making extrusion difficult. Accordingly, the feed rate was lowered to one-half of that of the foregoing Examples so that the compositions could be pelletized. The results are provided in Table 1.

9. A process as in claim 1, wherein said thermoplastic polyester resin contains between 3 to 30% by weight of a polycarbonate resin.

10. A method of making a fiber-reinforced polyester molding composition comprising the steps of:

TABLE 1

| | | Composition | | | | | Quality (physical properties) | | |
|---|---|---|---|---|---|---|---|---|---|
| | | (A) thermoplastic polyester resin | | poly-carbonate | (B) fibrous reinforcement (glass fiber, | (C) granulated glass flake[*3] | glass flake[*4] | distortion | tensile strength | processability |
| | | (kind) | (% by wt.) | (% by wt.) | % by wt.) | (% by wt.) | (% by wt.) | (mm) | (kg/cm$^2$) | in extrusion |
| Ex. No. | 1 | PBT[*1] | 60 | — | 20 | 20 | — | 0.9 | 1160 | 4 |
| | 2 | " | 60 | — | 10 | 30 | — | 0.2 | 965 | 4 |
| | 3 | " | 60 | — | 30 | 10 | — | 2.6 | 1320 | 4 |
| | 4 | PBT/PET[*2] | 45/15 | — | 20 | 20 | — | 0.6 | 1190 | 4 |
| | 5 | PBT | 50 | 10 | 20 | 20 | — | 0.03 | 1220 | 4 |
| Comp. Ex. No. | 1 | PBT | 60 | — | 40 | — | — | 5.5 | 1480 | 4 |
| | 2 | " | 60 | — | — | 40 | — | 0.1 | 765 | 4 |
| | 3 | " | 60 | — | 20 | — | 20 | 1.8 | 1140 | 2 |
| | 4 | " | 60 | — | 10 | — | 30 | 0.5 | 930 | 1 |
| | 5 | " | 60 | — | 30 | — | 10 | 4.5 | 1300 | 2 |
| | 6 | PBT/PET | 45/15 | — | 20 | — | 20 | 1.5 | 1170 | 2 |
| | 7 | PBT | 50 | 10 | 20 | — | 20 | 0.7 | 1190 | 2 |

[*1]PBT: polybutylene terephthalate resin (a product of Polyplastics, trade name: "Duranex")
[*2]PET: polyethylene terephthalate resin
[*3]mean particle diameter: 600 μm, (binder: epoxy resin, coupling agent: epoxysilane)
[*4]mean particle diameter: 600 μm, (ungranulated, coupling agent: epoxysilane)

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for preparing a polyester resin composition comprising melt-blending (A) a thermoplastic polyester resin, (B) between 3 to 65% by weight, based on the total composition weight, of a fibrous reinforcement medium, and (C) between 3 to 65% by weight, based on the total composition weight of binder-agglomerated glass granules.

2. A process as in claim 1, wherein said fibrous reinforcement medium includes glass fibers.

3. A process as in claim 1, wherein the binder-agglomerated glass granules include glass flakes agglomerated in a thermoplastic binder resin.

4. A process as in claim 1, wherein the binder-agglomerated glass granules include glass flakes agglomerated in an epoxy binder resin.

5. A process as in claim 1, wherein the binder-agglomerated glass granules have a mean particle diameter of between 100 to 2000 μm, and a maximum particle diameter which does not exceed 5000 μm.

6. A process as in claim 1, wherein the glass granules consist essentially of discrete glass flakes agglomerated in a thermoplastic binder resin.

7. A process as in claim 6, wherein the glass flakes each have a mean particle diameter of between 5 to 1000 μm and a mean thickness of between 0.5 to 7 μm.

8. A process as in claim 1, wherein said thermoplastic polyester resin is at least one selected from a homopolymer of polybutylene terephthalate resins and polyethylene terephthalate resins or a copolymer containing polybutylene terephthalate or polyethylene terephthalate units in an amount of at least 60% by weight.

forming a mixture of a thermoplastic polyester base resin, a fibrous reinforcing medium and glass flakes, and dispersing said glass flakes in said mixture, wherein said step of dispersing said glass flakes includes the steps of (i) introducing said glass flakes into said mixture in the form of binder-agglomerated glass granules each comprised of glass flakes and a thermoplastic binder, said binder-agglomerated glass granules having a mean particle diameter of between 100 μm and 2000 μm, and a maximum particle diameter which does not exceed 5000 μm, and then (ii) melt-blending said polyester base resin, said fibrous reinforcing medium, and said binder-agglomerated glass granules to form said molding composition.

11. A method as in claim 10, wherein said fibrous reinforcing medium and said binder-agglomerated glass granules are collectively present in said composition in an amount not exceeding 65% by weight based on the total composition weight.

12. A method as in claim 10, wherein the binder in said binder-agglomerated glass granules is a thermoplastic resin.

13. A method as in claim 10, wherein the binder in said binder-agglomerated glass granules is an epoxy resin.

14. A molded article consisting essentially of a polyester molding composition made according to claim 10.

15. A polyester resin molding composition comprising a blend of (A) a thermoplastic polyester resin, (B) between 3 to 65% by weight, based on the total composition weight, of a fibrous reinforcement medium, and (C) between 3 to 65% by weight, based on the total composition weight of binder-agglomerated glass granules.

16. A polyester resin molding composition as in claim 15 wherein said binder-agglomerated glass granules have a mean particle diameter of between 100 μm and 2000 μm, and a maximum particle diameter not exceeding 5000 μm.

17. A polyester resin molding composition as in claim 16, wherein said binder-agglomerated glass granules consist essentially of a number of discrete glass flakes agglomerated in a thermoplastic binder resin.

18. A polyester resin molding composition as in claim 17, wherein each of said glass flakes has a mean particle diameter of between 5 to 1000 $\mu$m, and a mean thickness of between 0.5 to 7$\mu$.

19. A polyester resin molding composition as in claim 17, wherein said reinforcement medium includes glass fibers.

20. A molded article formed of the polyester resin molding composition of any one of claims 15-19.

* * * * *

UNITED STATES PATENT AND TRADEMARK OFFICE
CERTIFICATE OF CORRECTION

PATENT NO.   :   5,075,354
DATED        :   December 24, 1991
INVENTOR(S)  :   MITSUUCHI et al It is certified that error appears in the above-identified patent and that said Letters Patent is hereby corrected as shown below:

Column 1, line 62, after "medium" delete "()" and insert --(C)--.

Column 5, line 3, after "weight)" insert --provided--;
          line 29, after "as" insert --a filament. The necessary components according to--;
          line 41, after "provide" change "composition" to --compositions--;
          line 65, after "chassis" insert --of--.

Signed and Sealed this

Twenty-fifth Day of May, 1993

Attest:

MICHAEL K. KIRK

Attesting Officer

Acting Commissioner of Patents and Trademarks